US009128006B2

(12) United States Patent
Rindlisbacher

(10) Patent No.: US 9,128,006 B2
(45) Date of Patent: Sep. 8, 2015

(54) SYSTEM FOR MEASURING PARTICULATE EMISSIONS OF AIRCRAFT ENGINES ON TEST BENCHES

(71) Applicant: AVL LIST GMBH, Graz (AT)

(72) Inventor: Theo Rindlisbacher, Gwatt (CH)

(73) Assignee: AVL List GmbH, Graz (AU)

( * ) Notice: Subject to any disclaimer, the term of this patent is extended or adjusted under 35 U.S.C. 154(b) by 0 days.

(21) Appl. No.: 14/411,749

(22) PCT Filed: Jun. 25, 2013

(86) PCT No.: PCT/EP2013/063285
§ 371 (c)(1),
(2) Date: Dec. 29, 2014

(87) PCT Pub. No.: WO2014/001338
PCT Pub. Date: Jan. 3, 2014

(65) Prior Publication Data
US 2015/0177105 A1    Jun. 25, 2015

(30) Foreign Application Priority Data

Jun. 25, 2012 (DE) .......................... 10 2012 105 535
Jul. 13, 2012 (DE) .......................... 10 2012 106 320

(51) Int. Cl.
G01M 15/00 (2006.01)
G01M 15/14 (2006.01)
G01M 15/10 (2006.01)

(52) U.S. Cl.
CPC .............. G01M 15/14 (2013.01); G01M 15/10 (2013.01); G01M 15/102 (2013.01)

(58) Field of Classification Search
USPC ....................................................... 73/112.01
See application file for complete search history.

(56) References Cited

U.S. PATENT DOCUMENTS

| | | | | |
|---|---|---|---|---|
| 7,017,400 B2* | 3/2006 | Grell | .......................... | 73/114.01 |
| 7,174,779 B1* | 2/2007 | Kwon | ........................ | 73/114.75 |
| 7,278,304 B2* | 10/2007 | Zanini-Fisher et al. | ... | 73/114.71 |
| 7,367,223 B2* | 5/2008 | Kettl et al. | .................... | 73/53.05 |
| 7,454,947 B2* | 11/2008 | Roby | ................................. | 73/7 |
| 7,506,535 B2* | 3/2009 | Kang | ......................... | 73/114.16 |
| 7,614,231 B2* | 11/2009 | Allain et al. | ................. | 60/605.1 |

(Continued)

FOREIGN PATENT DOCUMENTS

| | | | |
|---|---|---|---|
| AT | 11333 U2 * | 6/2010 | |
| AT | 11333 | 8/2010 | |

OTHER PUBLICATIONS

English Abstract of AT11333.

*Primary Examiner* — Lisa Caputo
*Assistant Examiner* — Jamel Williams
(74) *Attorney, Agent, or Firm* — Dykema Gossett PLLC

(57) ABSTRACT

So as to verify compliance with limit values for harmful substances, large engines today must be tested in accordance with the regulations of the International Civil Aviation Organization (ICAO). Presently neither a standardized measuring method nor a standard exists with respect to particulate emissions (ultrafine particles). The invention relates to the creation of a standardized transport system having the lowest possible loss for measuring ultrafine particles of aircraft engines, which can be operated simultaneously with the harmful substance measurement of aircraft engines stipulated until now. Appropriate instruments for measuring the particle count, mass and size distribution can be connected to this transport system.

16 Claims, 3 Drawing Sheets

(56) References Cited

U.S. PATENT DOCUMENTS 7,739,027 B2 * 6/2010 Kang et al. .................... 701/108
8,046,153 B2 * 10/2011 Kurtz et al. ................... 701/103
8,414,687 B2 4/2013 Li
8,756,987 B2 * 6/2014 Schoemig et al. ......... 73/114.75
2012/0073436 A1 * 3/2012 Li ..................................... 95/78

* cited by examiner

SYSTEM FOR MEASURING PARTICULATE EMISSIONS OF AIRCRAFT ENGINES ON TEST BENCHES

BACKGROUND AND SUMMARY OF THE INVENTION

Aircraft engines (gas turbines) are tested today in accordance with the global standard of the International Civil Aviation Organization (ICAO) with a homologation to verify compliance with limit values for the harmful substances NOx, HC, CO and the smoke number. This emission certification is described in the guidelines of Annex 16, Volume 2 of International Civil Aviation Organization ICAO 15. Neither a standardized measuring method nor a standard exists with respect to particulate emissions (ultrafine particles). International efforts are now in progress to introduce a certification regulation for particulate emissions.

The present prototype and the technical implementation thereof create an option to carry out particulate measurements (particle mass, count and size distribution) simultaneously with the exhaust gas measurement using a loss-optimized and standardized system.

The system for measuring particulate emissions of aircraft engines on test benches thus includes both the method for measuring the particulate emissions and the device suitable for carrying out the corresponding method. For the sake of simplicity, hereafter this is referred to as a system, wherein the term 'system' shall be understood to mean both the method and the device associated therewith.

FIELD OF APPLICATION

Future particulate measurements of aircraft engines on test benches. Standardization of systems and measuring methods. Introduction of a fine particle certification for aircraft engines.

PROBLEM

The dimensions of aircraft engines and the power development thereof necessitate a spatial separation of the instruments from the engine. This results in very long lines with accordingly high particle losses. A key factor for reducing line losses is the residence time of the exhaust gases in the lines. For this purpose, the inside line diameter and the flow rate would have to be balanced. For particulate measurements, an "in-line" pump would cause enormous and uncontrollable losses. The present prototype generates a high constant flow rate, without an "in-line" pump and without the pressure drop becoming too large for the instruments.

This is achieved by a device having a first flow splitter, the inlet of which is connected to a probe for withdrawing exhaust gas of the aircraft engine and which splits the exhaust gas flow into a particle line and a line connected to a bleed valve, wherein a pressure sensor is provided upstream of the inlet of the first flow splitter, the pressure sensor being used to set a predefined overpressure upstream of the first flow splitter, wherein the particle line from the first flow splitter is connected to the inlet of a first dilution stage in which the exhaust gas is diluted at a certain ratio, the outlet of the first dilution stage is connected to the inlet of a second flow splitter, and an exhaust having a valve is provided on the first dilution stage, and wherein an outlet of the second flow splitter is connected to an instrument for particulate measurement, and another outlet of the second flow splitter is connected to a pump for setting a predefined flow through the particle line.

A constant flow rate must be maintained in the measuring line leading to the instruments so as to increase the robustness of particulate measurements, regardless of the number of instruments that are attached. In addition to a "mass flow controller," the present prototype uses two appropriately positioned pressure sensors for monitoring a constant pressure drop in a transport line that is controlled to a temperature of 60° C. So as to simultaneously measure harmful substances and particulate emissions, the exhaust gas flow must be split downstream of the withdrawal probe. Since back pressure from the engine still has to be relieved at the splitting point in the case of higher engine output, a flow splitter is required, which splits the flow into three lines with the lowest possible ions of particulates. A second, identical flow splitter is required to split the particulate flow for the mass, count and size measurement, and for generating the aforementioned constant flow rate. Such a flow splitter part, which satisfies the requirements, could not be found commercially. It is specified in the description and is an integral part of the system.

The inlet pressure at the first dilution stage for the particle line must be kept as constant as possible. The prior art provides for manual control of a blow-off valve. This control was automated in the present prototype. Controlling the temperature of the measuring lines and of the components thereof is very important to minimize particulate losses and was ascertained in research activity. According to today's state of the art, individual line components (valves, splitters. T-pieces) are installed in a heatable box. Since the components are usually made of chrome steel alloys having poor thermal conductivity, it takes many hours until the parts installed in boxes are evenly heated through. For the present prototype, system parts were installed in open cages, and special thermostatic heating pads were developed for this purpose, which directly enclose the components and allow heating to the operating temperature within one hour.

Further features according to the invention and advantages of the invention will be apparent from the claims and the following description.

DESCRIPTION AND EXEMPLARY EMBODIMENT OF THE INVENTION

Figure 1:
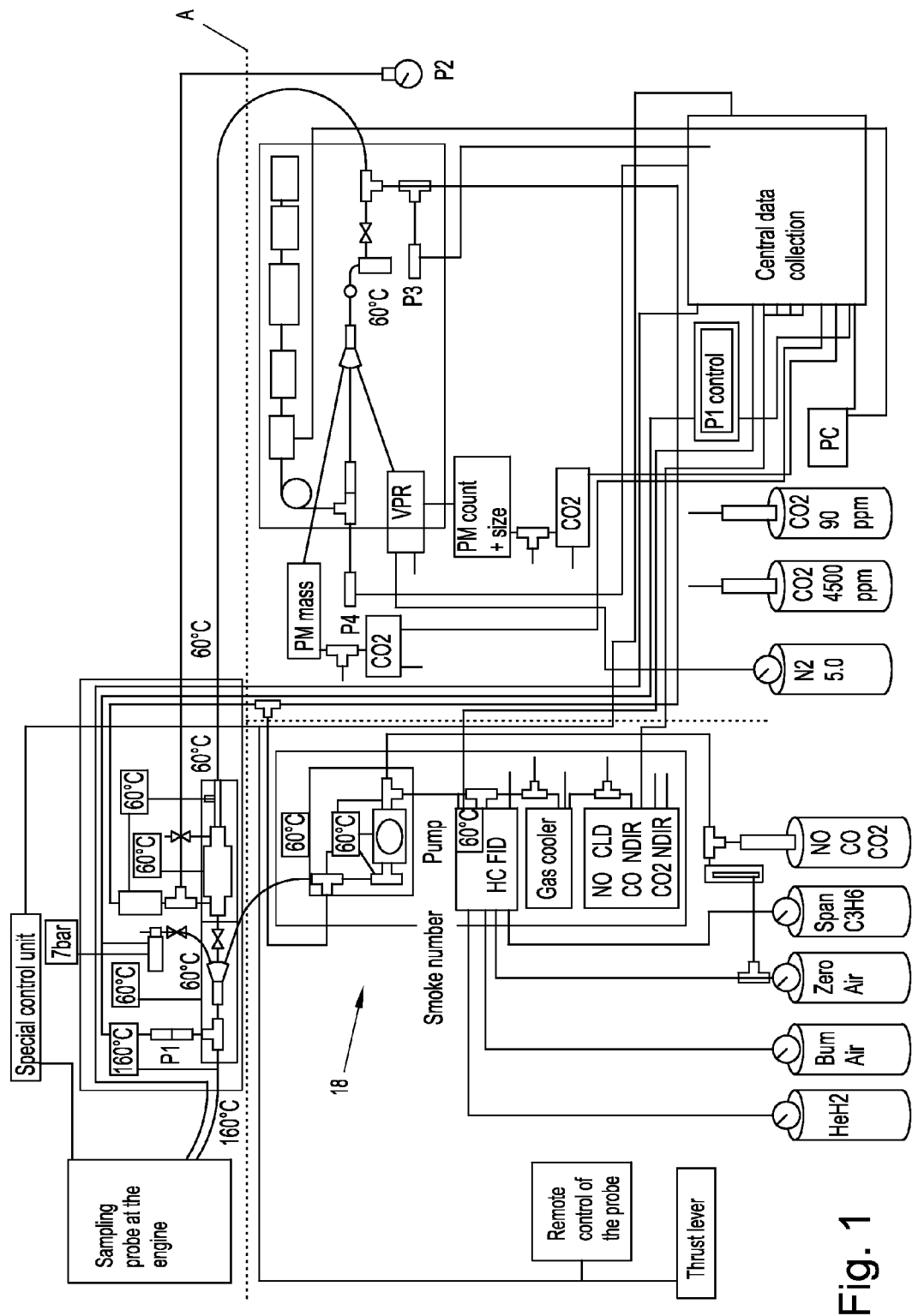
FIG. 1 shows the overall system, including a withdrawal probe on the engine and the gas analysis device.

FIG. 1 shows the overall system, including a withdrawal probe on the engine and the gas analysis device. The overall system comprises a method suitable for measuring particulate emissions of aircraft engines on test benches. All parts shown above the black dotted line A are located within the engine test cell in the actual implementation. Parts below this line A are located in aside room, separate from the engine. On the bottom left of FIG. 1 the parts for the gas analysis device (harmful substance analysis device 18) can be seen; on the right, the remaining parts for the particulate measurement are shown.

Figure 2:
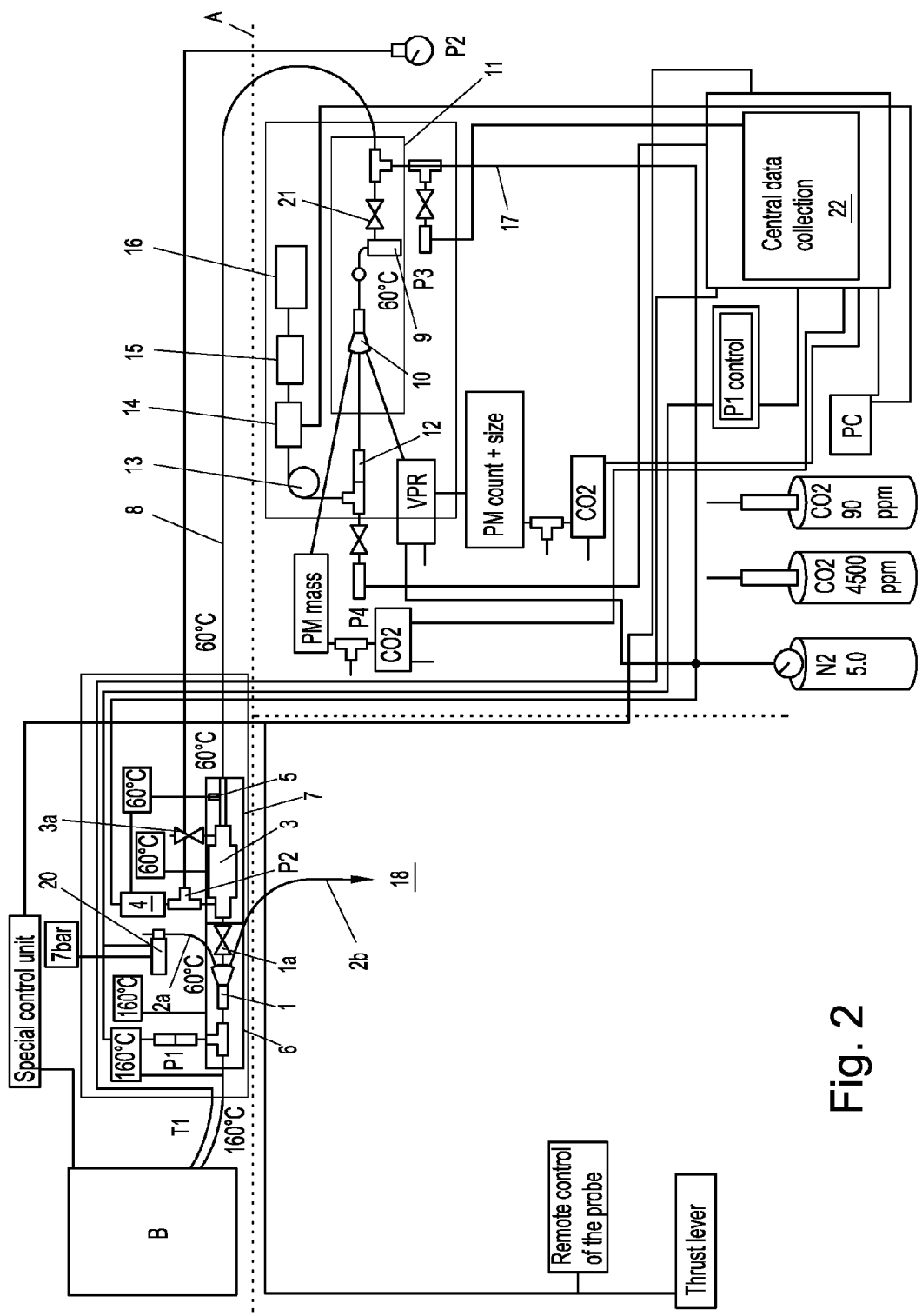
FIG. 2 shows the parts of the overall system described within the scope of the patent application for supplementing the existing ICAO exhaust gas measuring system with the particulate measurement.

The overall system comprises a method suitable for measuring particulate emissions of aircraft engines on test benches. FIG. 2 shows the parts described within the scope of the patent application for supplementing the existing ICAO exhaust gas measuring system with the particulate measurement. With the exception of the flow splitters 1, 10 and the heating pads, all individual parts were commercially available at the time of implementation. The entire line system for the particulate measurement was specified to an inside diameter of at least 8.0 mm and, unless noted otherwise, chrome steel alloys were used. It was ensured that step-free transitions were used when selecting line components and connections.

All numbers of the description hereafter refer to the drawing of FIG. 2.

The exhaust gases and the particulates from the aircraft engine reach the first splitter 1 through a withdrawal probe B, which is specified in accordance with ICAO Annex 16, Volume 2, within no more than 3 seconds, and at a line length of preferably no more than 8 m. The exhaust gases are stabilized to a temperature of 160° C. along the way. The first flow splitter unit 1 is likewise controlled to 160° C. by a heating pad 6, which exactly encloses the parts.

Figure 3:
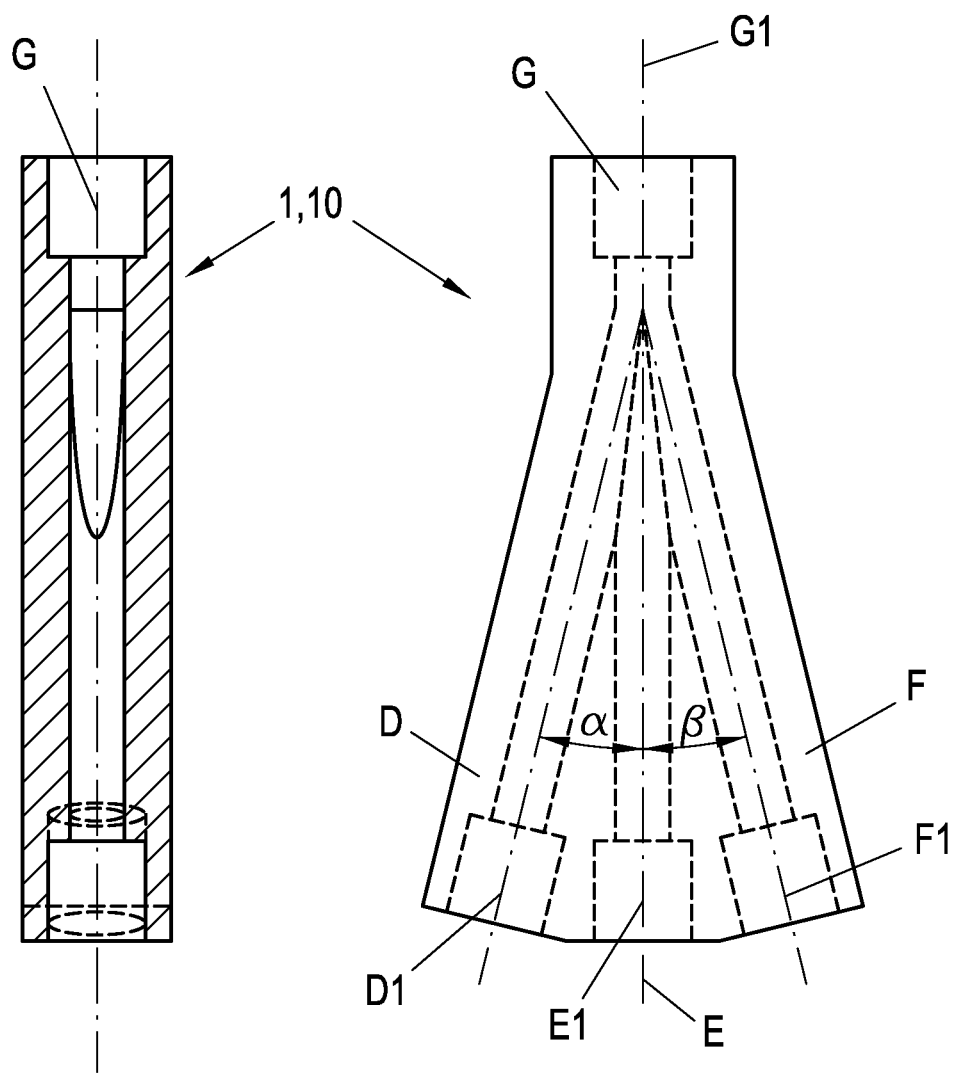
FIG. 3 shows the design of the flow splitter.

At the flow splitter 1, the exhaust gas flow is split into the downwardly extending exhaust gas line 2b for the harmful substance analysis device 18 (which is not the subject matter of the invention), into the rectilinearly extending particulate line 8 for the particulate measurement, and into the upwardly extending line 2a for blowing off the overpressure 2, which arises due to back pressure at the exhaust gas probe when powering up the engine. As with the line system, the boreholes in the first flow splitter 1 have an inside diameter of 8.0 mm. The specifications and the design of the flow splitter 1 are compiled in FIG. 3.

The flow splitter 1 splits the sample gas supplied via the inlet section G into three portions, which are discharged via the outlet sections D, E, F. The middle outlet section E extends in alignment with the inlet section G, or the longitudinal axis G1 of the inlet section G coincides with the longitudinal axis E1 of the middle outlet section E. The longitudinal axes D1, F1 of the upper outlet section D and of the lower outlet section F in each case form an upper section angle α and a lower section angle β with the longitudinal axis E1 of the middle outlet section E, the angles being 14°, in absolute terms, in each case in the illustrated exemplary embodiment. The diameter of the individual sections is selected to be 8 mm.

An air-cooled pressure sensor P1 having a measuring range from a vacuum to plus 1.5 bar relative to the ambient air is located upstream of the first flow splitter 1. The pressure is to be stabilized to +0.02 bar above the ambient pressure upstream of the first flow splitter 1. This pressure stabilization is necessary so that the first dilution stage 3, which is seated in the particle line 8 downstream of the first flow splitter 1, operates with as constant a dilution as possible. The first dilution stage 3 is an ejector dilutor, in which particulate-free nitrogen is blown in via a critical nozzle at an operating pressure of 2 bar (measured via the pressure sensor or pressure gauge P2). In addition to the dilution function, the ejector dilutor generates a small negative pressure, which can be used to pump approximately 4 liters per minute at the ambient pressure. The ejector dilutor is therefore a pump and a dilution stage all in one. The existing exhaust gas measuring device 18 pulls approximately 16 liters per minute via an "in-line" pump (see FIG. 1). Together with the ejector dilutor in the first dilutor 3, the exhaust gas flow upstream of the first flow splitter 1 is approximately 20 liters per minute. Common exhaust gas probes conforming with ICAO Annex 16 can just barely supply this volume in engine idle with 7% thrust. When the engine thrust increases, the blow-off valve 20 opens more and more so as to maintain the inlet pressure at the flow splitter 1 at +0.02 bar above the ambient pressure. The blow-off valve 20 operates pneumatically at an operating pressure of 7 bar. It is controlled by a separate regulating loop via the pressure sensor P1. The dimensions of the blow-off valve 20 constitute a compromise between the ability to blow off sufficient excess exhaust gas volume at full thrust of the engines and nonetheless control it sufficiently precisely and constantly to +0.2 bar.

In the ejector dilutor, the exhaust gas is diluted with particulate-free nitrogen approximately at a ratio of 8 to 10:1. The dilution is an essential element for curtailing particulate losses over the long line from there to the instruments for particulate measurement. It also makes it possible to arrive at a lower temperature level practically without losses, specifically from an exhaust gas temperature of 160° C. down to 60° C. For this purpose, the supplied nitrogen is appropriately preheated in a preheater 4. The preheater 4 can also include a HEPA lifter for filtering the supplied gas (nitrogen here, but air or pure $CO_2$ gas is also possible). The preheating temperature is regulated via a temperature sensor 5, so that a temperature of 60° C. is reached at the outlet of the dilution stage (at 5). The transition into the particle line 8, which likewise is regulated to 60° C., thus takes place without a temperature surge, which is important to minimize particulate losses. The dilution rate of approximately 8 to 10:1 additionally prevents recondensation of water vapor in the transported exhaust gas at 60° C. The ejector dilutor itself is likewise maintained at 60° C. by way of a heating pad 7. A valve 3a is boated at the exhaust of the same. This valve 3a is normally open. It can be dosed for back-flushing the particle line 8 and the dilution stage 3. The operating pressure of the dilution stage 3 (injection pressure of the dilution air, P2) is, as was already mentioned, normally 2.0 bar and is monitored by way of a pressure gauge P2.

A grease-free ball valve 1a, having an inner step transition of no more than 0.2 mm compared to the required inside diameter of 8.0 mm specified for the entire particle line system, is located between the first flow splitter 1 and the dilution stage 3. The valve 1a is needed to be able to separate the particle system when the gas system 18 must be checked for leaks. Moreover, this valve 1a can be closed before measurements so as to measure the particle concentrations of the ambient air by way of the fine particulate instruments via the orifice 3a (with the dilution air deactivated), and to carry out a zero measurement by activating the particulate-free dilution air at the ejector dilutor and the instruments then pulling from the "zero air," The valve 1a is then opened, with the dilution air activated, for measuring the engine exhaust gas or particulates.

The particulates reach the separator 9 for larger particles (cyclone) via a preferably 12 m long particle line 8, which is made of carbonized Teflon and stabilized to 60° C. The cyclone 9 is to separate particles having a mobility diameter of >1 micrometer at a flow of 25 liters per minute. In this way, it is prevented that individual agglomerated pieces that break free from time to time in the particle line 8 interfere with the measurement of the particle mass from the engine. (Engines do not emit any particles in the order of magnitude of micrometers, but much smaller ones).

A further grease-free ball valve 21, having as step-free as possible an inner transition of no more than 0.2 mm, is located upstream of the cyclone 9. The valve can be closed so as to back-flush the particle line 8 with particulate-free air via the connection 17.

Downstream of the cyclone 9, the particles reach a further, second flow splitter 10, which has a design identical to that of the first flow splitter. The second flow splitter 10 symmetrically splits the particulate flow into a line for measuring the particle mass concentration and for measuring the particle count concentration or size distribution. "VPR" denotes "volatile particle remover," a device for suppressing volatile particles. Volatile particles are not to be measured. Both the VPR and the instruments are not the subject matter of the described invention.

The middle line of the second flow splitter 10 is used to achieve a constant high flow in the particle line 8. A maximum residence time of 7 seconds is specified from sampling to the cyclone 9. A pump 16 having a maximum delivery capacity of 20 liters per minute is used for this purpose. As was described earlier, a pump 16 must not be installed in the actual particle line 8 for particulate measurements since a great number of particles would get caught in it. Since the flows of the instruments themselves cannot be increased, the only variant that remains is that of simultaneously pulling samples by way of a pump 16, upstream of the instruments. When pulling occurs upstream of the measuring instruments, this normally causes the pump 16 to pull samples not only at the particle line 18, but also to be able to pull back exhaust gas of the instrument lines, which is to reach the measuring instruments.

The trick to ensuring that this no longer happens is as follows: the ejector dilutor in the dilutor 3, due to the design thereof, is able to supply approximately 40 liters per minute of diluted exhaust gas at the outlet thereof (at the inlet, it pulls approximately 4 liters per minute, dilution is approximately 10:1→40 liters per minute). Since the 40 liters per minute is available compared to ambient pressure, the pump 16 and the instruments together are able to pull an accordingly high volume almost without any drop in pressure. Considering a safety margin, a total flow through the second flow splitter 10 of 25 liters per minute is specified. The excess volume of the ejector dilutor escapes in the dilutor 3 via the valve 3a through the exhaust of the dilutor. The pressure drop as a result of the pump operation is measured upstream of the cyclone 9 by way of the pressure sensor P3 and upstream of the pump using P4. The measuring range of these pressure sensors is −300 to +300 mbar compared to the ambient pressure. During system operation, P3 is approximately −20 mbar, and the lowest value of P4 is approximately −50 mbar. Monitoring of P3 is used to monitor the constant flow through the line 8. This value must always remain constant (corresponding to a total flow of 25 liters per minute at 60° C.), regardless of the number of attached instruments and the engine power. A relation is established between the value of P4 and the instrument specifications to ensure that no exhaust gas is pulled back. If no changes are made to the instruments, this flow must also be constant.

The exhaust gas pulled by the pump 16 first travels through a filter 12, and then through cooling coil 13, before reaching the mass flow meter 14. The filter keeps impurities that are not separated by the cyclone 9 during start-up and deactivation processes out of the mass flow meter 14. In the cooling coil 13, the exhaust gas temperature is lowered from 60° C. to room temperature. A compensating vessel 15 having a volume of 2 liters is located between the mass flow meter 14 and the pump 16. It is used to smoothen the oscillating flow generated by the pump 16 so as to allow for stable operation of the mass flow meter 14. The mass flow meter 14 is adjusted by software in such a way that the flow thereof, together with the instrument flow, always amounts to 25 liters per minute. The fine tuning is carried out by way of P3. A valve is installed in each case upstream of the pressure sensors P3 and P4 for protecting the same. In particular when back-flushing the lines with particulate-free air (connection 17) or when operating the pump 16 with the measuring line closed, pressure levels that exceed the measuring range of these sensors can arise.

The entire arrangement, comprising the connection to the cyclone 9, the second flow splitter 10 and the connecting lines for the instruments, is enclosed by a precisely fitting heating pad 11, which is controlled to 60° C. Both the measurement of the particle mass concentration and that of the particle count concentration and size distribution are carried out with diluted exhaust gas. To determine the original concentrations, the dilution ratios at the first dilution stage 3 and downstream of the VPR must be determined. $CO_2$ measurements of the engine exhaust gas are used for this purpose. The starting concentration of $CO_2$ is determined using the existing gas analysis device 18, the dilution ratio of the first dilution stage is determined at the site of the measurement of the particle mass, and the dilution ratio of the VPR system is determined at the site of the measurement of the particle count or size distribution. For this reason, a respective $CO_2$ measuring device is illustrated in the system drawing downstream of the devices for the particle mass (PM mass) and particle count (PM count/size). The $CO_2$ concentrations from the exhaust gas are very low (in the ppm range) downstream of the VPR system. To improve the accuracy of the measurement of the VPR dilution, it is possible to use pure $CO_2$ gas instead of nitrogen as the dilution air (position 4) before and after measuring an engine. If the shut-off valve 1a upstream of the ejector dilutor is closed, the instruments are provided with pure $CO_2$, and the $CO_2$ concentrations reach as much as several thousand ppm downstream of the VPR.

Depending on the number of instruments used for particulate measurement, a second flow splitter 10 having a different number of parallel flow paths can be provided, or one flow path can be closed. The same applies to the first flow splitter 1, for example when no gas analysis device 18 is provided.

All sensors and control elements are combined into a central data collection system 22.

The invention claimed is:

1. A method for measuring particulate emissions of aircraft engines on test benches, wherein an inlet of a first flow splitter is connected to a probe for withdrawing exhaust gas from the aircraft engine, the exhaust gas flow is split by way of the first flow splitter into a particle line and a line connected to a blow-off valve, and a pressure sensor is used to set a predefined overpressure upstream of the first flow splitter, and the particulate line is connected to the inlet of a first dilution stage in which the exhaust gas is diluted at a certain ratio, and excess volume escapes via an exhaust having a valve on the first dilution stage, furthermore the outlet of the first dilution stage is connected to the inlet of a second flow splitter, and an outlet of the second flow splitter is connected to an instrument for particulate measurement, and another outlet of the second flow splitter is connected to a pump for setting a predefined flow through the particulate line.

2. The method according to claim 1, wherein the exhaust gas flow is additionally split into a further exhaust gas line by way of the first flow splitter for harmful substance analysis.

3. The method according to claim 1, wherein the pressure for the inlet pressure at the first dilution stage is controlled automatically.

4. The method according to claim 1, wherein a temperature sensor is positioned between the outlet of the first dilution stage and the inlet of the following particle line so as to regulate the temperature of the dilution stage without a temperature surge between the diluted exhaust gas and the attached particle line.

5. The method according to claim 1, wherein a short residence time is generated in the particle line by using an ejector dilutor, which provides a high volume flow, and a pump, which pulls samples simultaneously with the instruments.

6. The method according to claim 1, wherein the total volume flow in the particle line is stabilized to a constant value by a mass flow meter having a compression volume, by a pressure sensor upstream of the separator for coarse particles, and by a pressure sensor upstream of the mass flow meter.

7. The method according to claim 1, wherein temperature-controlled heating pads are used which are closely matched to the components that are used.

8. A device for measuring particulate emissions of aircraft engines on test benches, wherein a first flow splitter is provided, the inlet of which is connected to a probe for withdrawing exhaust gas of the aircraft engine and which splits the exhaust gas flow into a particle line and a line connected to a blow-off valve, and a pressure sensor is provided upstream of the inlet of the first flow splitter, the pressure sensor being used to set a predefined overpressure upstream of the first flow splitter, and the particulate line from the first flow splitter is connected to the inlet of a first dilution stage in which the exhaust gas is diluted at a certain ratio, the outlet of the first dilution stage is connected to the inlet of a second flow splitter, and an exhaust having a valve is provided on the first dilution stage, and an outlet of the second flow splitter is connected to an instrument for particulate measurement, and another outlet of the second flow splitter is connected to a pump for setting a predefined flow through the particulate line.

9. The device according to claim 8, including a separator upstream of the inlet of the second flow splitter.

10. The device according to claim 8, including an expansion vessel upstream of the pump.

11. The device according to claim 8, including at least one mass flow meter upstream of the pump.

12. The device according to claim 8, including a cooling coil upstream of the pump.

13. The device according to claim 8, including a filter upstream of the pump.

14. The device according to claim 8, including at least one pressure sensor in the particle line.

15. The device according to claim 8, including a heating pad at least at the first flow splitter and/or at the second flow splitter and/or at the first dilution stage.

16. The device according to claim 8, wherein a flow splitter comprises an inlet section and three outlet sections, wherein the longitudinal axis of the middle outlet section coincides with the longitudinal axis of the inlet section, and the longitudinal axes of the two other outlet sections are disposed at an incline with respect to the longitudinal axis of the middle outlet section.

* * * * *